(12) United States Patent
Hopp et al.

(10) Patent No.: US 8,891,083 B2
(45) Date of Patent: Nov. 18, 2014

(54) DEVICE FOR MEASURING THE ROTATING ANGLE OF TWO OBJECTS ROTATING ON A ROTATING AXIS RELATIVE TO EACH OTHER

(71) Applicant: Sick Stegmann GmbH, Donaueschingen (DE)

(72) Inventors: David Hopp, Donaueschingen (DE); Michael Speidel, Freiburg (DE)

(73) Assignee: Sick Stegmann GmbH, Donaueschingen (DE)

( * ) Notice: Subject to any disclaimer, the term of this patent is extended or adjusted under 35 U.S.C. 154(b) by 0 days.

(21) Appl. No.: 13/668,625

(22) Filed: Nov. 5, 2012

(65) Prior Publication Data
US 2013/0128269 A1    May 23, 2013

(30) Foreign Application Priority Data
Nov. 22, 2011 (EP) ..................................... 11190160

(51) Int. Cl.
*G01J 4/00*    (2006.01)
*G01D 5/34*    (2006.01)

(52) U.S. Cl.
CPC ........................................ *G01D 5/345* (2013.01)
USPC ........................................................ 356/364

(58) Field of Classification Search
USPC ................................. 356/364; 250/231.14, 225
See application file for complete search history.

(56) References Cited

U.S. PATENT DOCUMENTS

| | | | |
|---|---|---|---|
| 5,424,535 A * | 6/1995 | Albion et al. | 250/225 |
| 5,815,269 A * | 9/1998 | Crabb et al. | 356/364 |
| 7,196,320 B1 * | 3/2007 | Rickenbach | 250/231.14 |

FOREIGN PATENT DOCUMENTS

EP    2187178 A1    5/2010

OTHER PUBLICATIONS

Search report (in German) of corresponding priority application—11190160.9 (Search Dated: Jul. 18, 2012).

* cited by examiner

*Primary Examiner* — Tarifur Chowdhury
*Assistant Examiner* — Jamil Ahmed
(74) *Attorney, Agent, or Firm* — Nath, Goldberg & Meyer; Jerald L. Meyer

(57) ABSTRACT

The disclosure conveys a device for measuring the rotating angle of two objects which rotate relative to each other around a rotating axis, with one transmitter, which is assigned to one of the objects and which emits light that is polarized, and with a polarization-sensitive polarizer, such that the transmitter and the polarizer rotate relative to each other, and such that the polarizer has a polarizing area and a non-polarizing area, where the non-polarizing area is positioned eccentric to the rotating axis, and such that the device has a first receptor and a second receptor which measure a portion of the luminosity passing through the polarizer producing signals that are dependent on the rotating angle, and where the first receptor has a first reception area, and the second receptor has a second reception area which is distinct from the first reception area.

9 Claims, 5 Drawing Sheets

Figure 1:
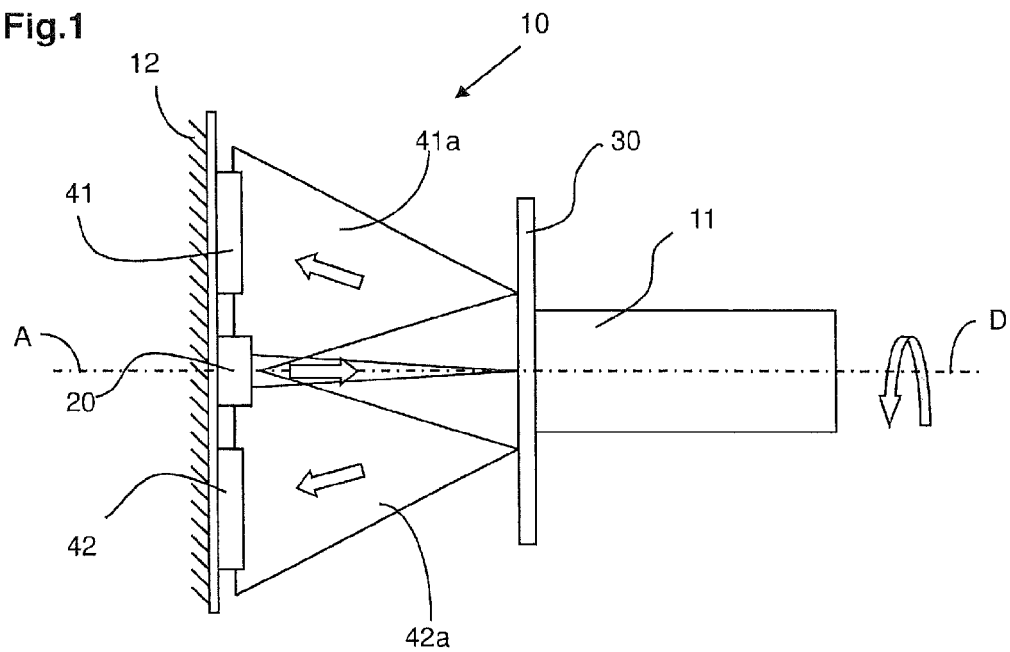

DEVICE FOR MEASURING THE ROTATING ANGLE OF TWO OBJECTS ROTATING ON A ROTATING AXIS RELATIVE TO EACH OTHER

The invention relates to a device for measuring the rotating angle of two objects rotating on a rotating axis relative to each other, in accordance with the preamble of claim 1.

For many applications, it is of basic importance to measure the angle of rotation of the rotating object. In general, the rotating angle of the rotating object is measured in relation to a stationary object, to which a measuring gauge is attached. For example, the rotating object may be the rotating shaft of a motor, which revolves in relation to a stationary machine part. The measuring gauge may be both incremental and absolute. Here it is desirable for the measurement of the relative rotational movement to be as insensitive to tolerance as possible, but also to afford a high degree of accuracy. In the ideal case, the measurement will be performed without contact, to thereby avoid mechanical wear.

EP 2 187 178 A1 discloses a principle of measurement that uses the optical polarization of light. To measure the rotating angle of two objects rotating opposite each other, a transmitter emits light that is polarized in linear fashion. The light passes through a polarization filter which rotates opposite the transmitter, as a function of the rotating angle. The luminosity of the light passing through the polarizing filter is measured by a receiver and is evaluated or plotted as a signal that is dependent on the rotating angle.

A disadvantage of polarization when used to measure the rotating angle of two objects rotating in relation to each other lies in the fact that the symmetry of a linear polarizer does not permit the rotating angle to be absolutely measured over 360° in mechanical fashion, but only over 180°.

From U.S. Pat. No. 7,777,879 B2 it is known to apply code-spurs to a polarizer, which are scanned with additional light transmitters and light receptors, in order to measure a polarizer's rotation over 180° and to thereby achieve an absolute angular measurement of 360°. This kind of configuration, involving additional transmitters and receptors, is also complicated and cost-intensive.

The goal of the invention, therefore, is to specify an improved device for measuring the rotating angle of two objects rotating around a rotating axis relative to each other, and, in particular, a device that can determine the rotating angle over 360° in a simple and cost-effective manner.

The goal of the invention is achieved by a device with the features of patent claim 1.

Advantageous embodiments and elaborations of the invention are indicated in the dependent claims.

The device according to the invention for measuring the rotating angle of two objects rotating relative to each other around a rotating axis—with precisely one transmitter which is assigned to one of the objects and which emits light that is either polarized or becomes polarized by means of a polarization filter, and with a polarizer such that the transmitter and the polarizer rotate relative to each other as a function of the rotating angle—is distinguished by the fact that the polarizer has a polarizing area and a non-polarizing area, where that the non-polarizing area is positioned eccentric to the rotating axis, and by the fact that the device has at least a first receptor and a second receptor which measure at least a portion of the luminosity passing through the polarizer, or reflected by the polarizer, in order to produce signals that are dependent on the rotating angle, and by the fact that the first receptor has a first reception area and the second receptor has a second reception area which is distinct from the first reception area.

Reception areas are understood as those subspaces from which the corresponding receptor is able to detect light. For example, the subspaces are separated by the planes on which the rotating axis lies. As a rule, detection of scattered light from adjacent subspaces cannot be completely excluded, however. Thus the two receptors are so configured that they do not detect all the light passing through or reflected by the polarizer, but only the light coming from the corresponding subspace located in front of the polarizer. Due to the polarizing area of the polarizer, the linearly polarized light from the light transmitter undergoes a modulation in intensity, as a function of the rotating angle. Because the polarizer is segmented into a polarizing area and a non-polarizing area that is positioned eccentric to the rotating axis, the light also undergoes a superimposed modulation. Due to the two receptors and their different reception areas, the two maxima of the signals detected in each of the receptors have different maximum amplitudes. The sum signal of the two detectors yields a signal with two maxima of the same amplitude. To detect a clear assignment of the angular position for 360°, the differential signal can be formed from the signals from the two receptors.

The non-polarizing area can be advantageously designed as a circular segment or circular sector, or as an area marked off by two intersecting secants—to thereby provide a simple and cost-effectively produced boundary between the polarizing and non-polarizing areas.

According to a preferred embodiment, the non-polarizing area can be designed as an absorbent area, which can be produced with particular ease and cost-effectiveness.

According to an alternative preferred embodiment of the invention, the non-polarizing area can be designed as a reflective area which is positioned at an angle to the surface of the polarizing area which differs from 180°, in order to thereby prevent the reflected light from being detected by the receptors.

The polarizer is advantageously produced as a reflective polarizer, in order to permit a simple and compact design.

According to an especially preferred embodiment of the invention, there is positioned between the polarizer and the receptors a diaphragm, which has one opening per receptor and which has, in particular, a central opening for the transmitter. A diaphragm of this kind allows the tolerances of the lateral positions to be adjusted in rough fashion.

According to a preferred embodiment of the invention, the first and second receivers are symmetrically positioned relative to the transmitter, and at an angular distance of 180° from each other, a fact which particularly simplifies the evaluation of the detected signals. A third and fourth receptor can be advantageously provided, such that the four receptors are each positioned at an angular distance of 90° from each other. With a configuration like this it is easily possible to determine the absolute rotating angle of the object over 360°.

Particularly preferred is the provision of eight receptors, which are positioned at the same angular distance from each other, in order to thereby improve the accuracy of the measured angle.

According to a preferred embodiment of the invention, the polarizing area of the polarizer has at least two different polarizing directions, in order to thereby improve the resolution of the angular measurement or, as the case may be, to improve the signal quality.

Figure 2:
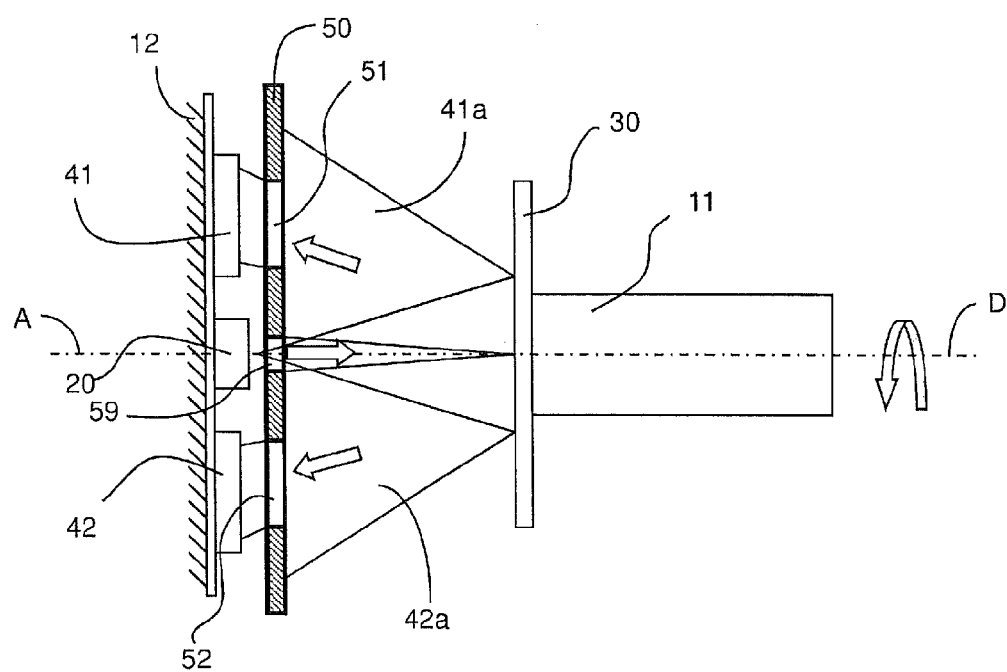
Figure 3:
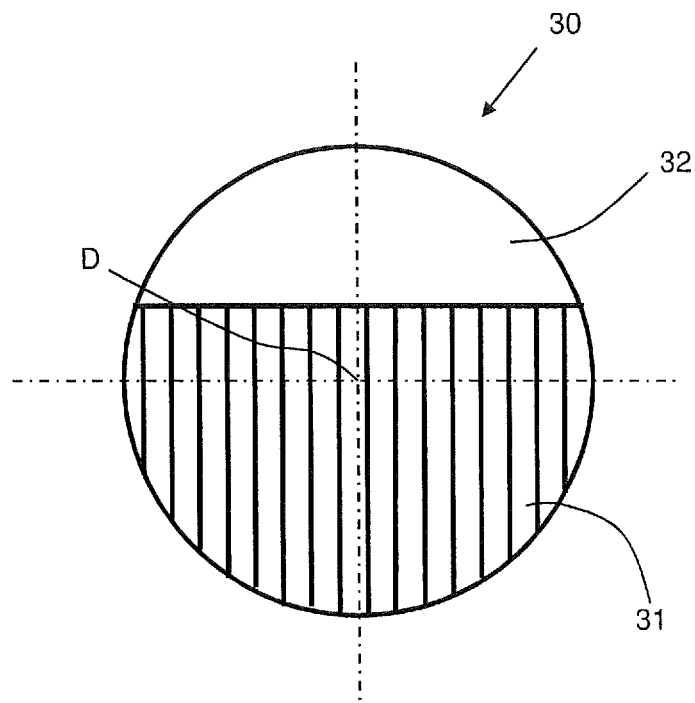
Figure 4:
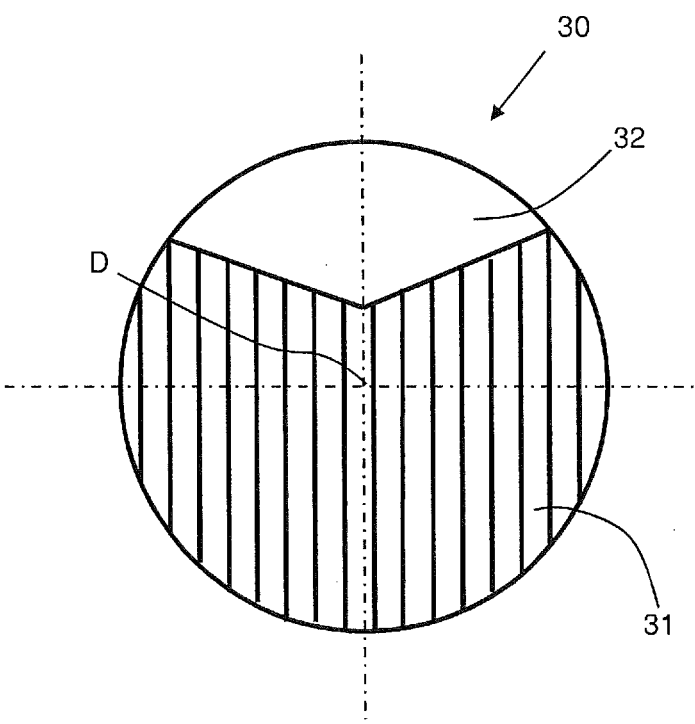
Figure 5:
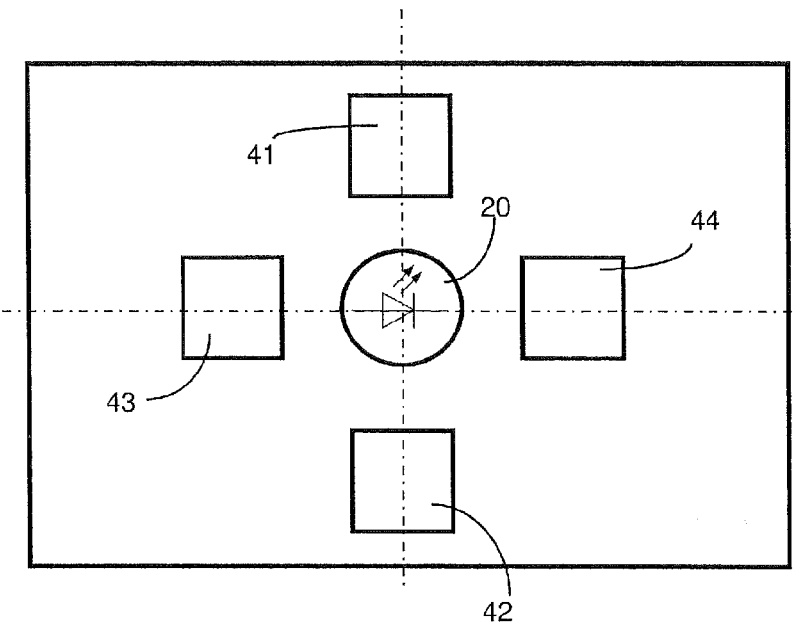
Figure 6:
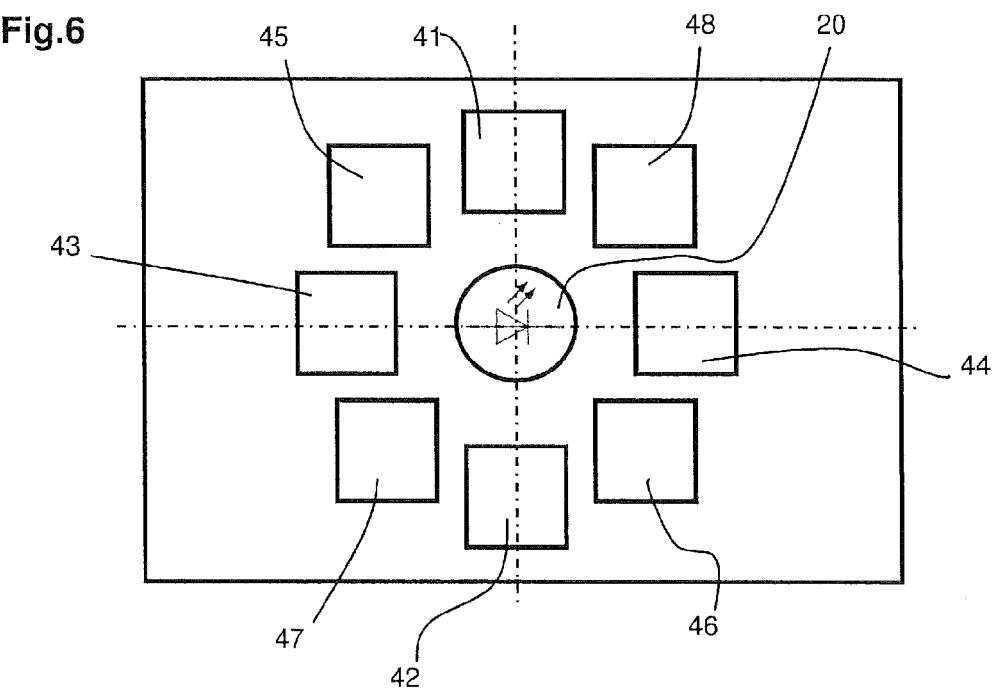
Figure 7:
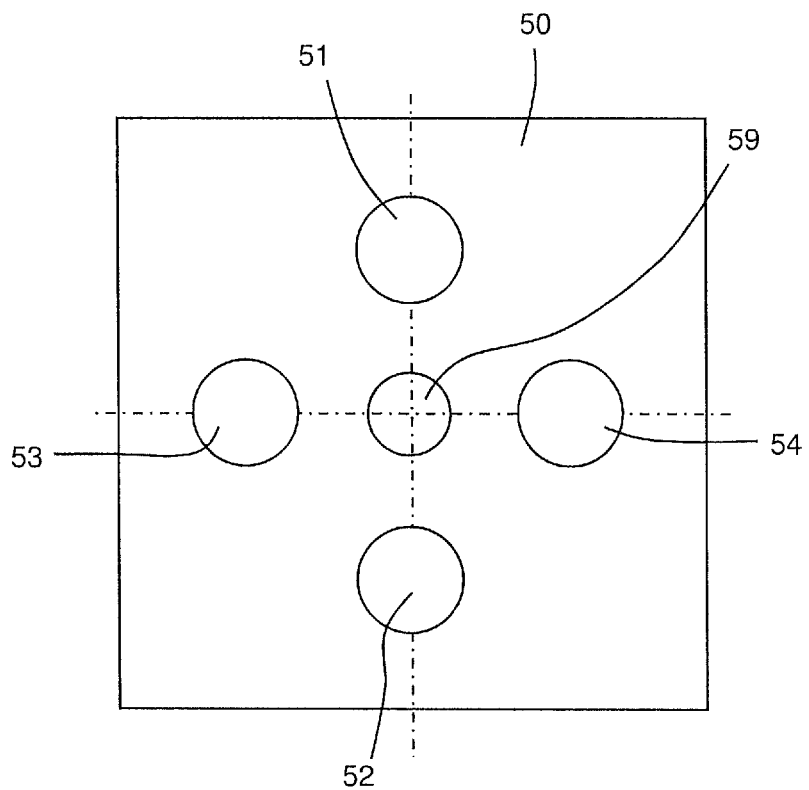
Figure 8:
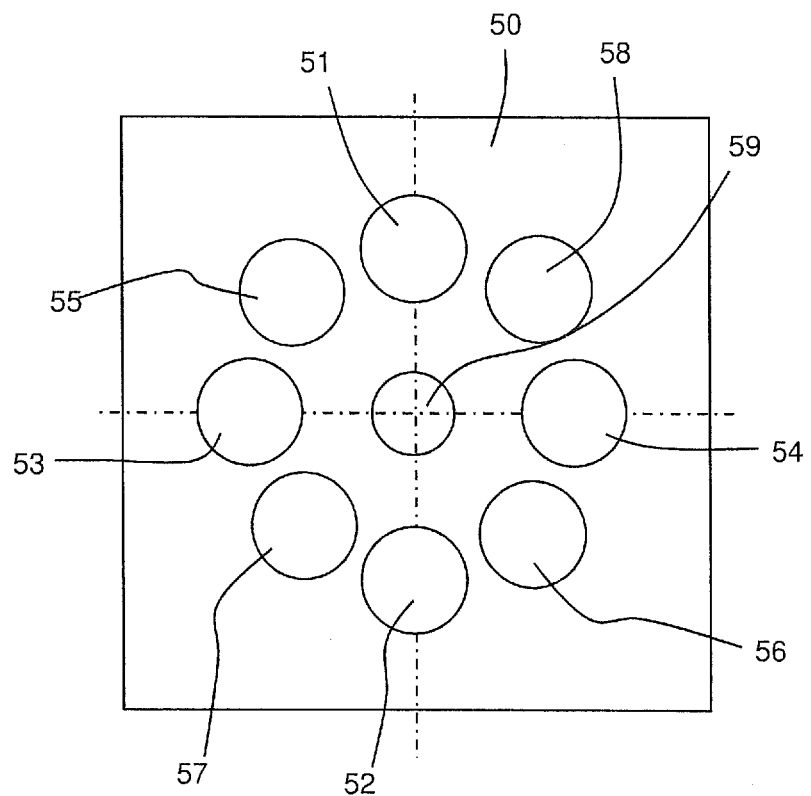
Figure 9:
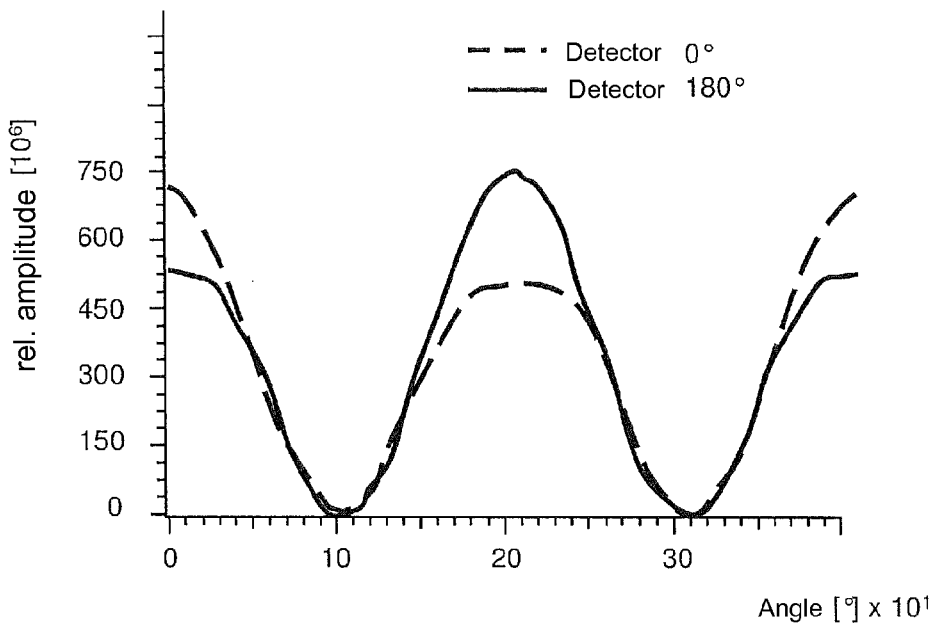

The invention will next be described on the basis of the following figures. Shown are:

FIG. 1 a schematic depiction of a device for measuring the angle of rotation of two objects rotating in relation to each other, according to one embodiment of the invention FIG. 2 a device according to FIG. 1, with an additional diaphragm FIG. 3 a top view of the polarizer in FIG. 1, in a first embodiment FIG. 4 a top view of the polarizer in FIG. 1, in a second embodiment FIG. 5 a schematic depiction of the optical module of the device in FIG. 1, in a first embodiment FIG. 6 a schematic depiction of the optical module of the device in FIG. 1, in a second embodiment FIG. 7 a schematic depiction of the diaphragm of the device in FIG. 2, in a first embodiment FIG. 8 a schematic depiction of the diaphragm of the device in FIG. 2, in a second embodiment FIG. 9 the signal amplitudes of the signals detected by the first and second receptors of the device in FIG. 1

Figure 10:
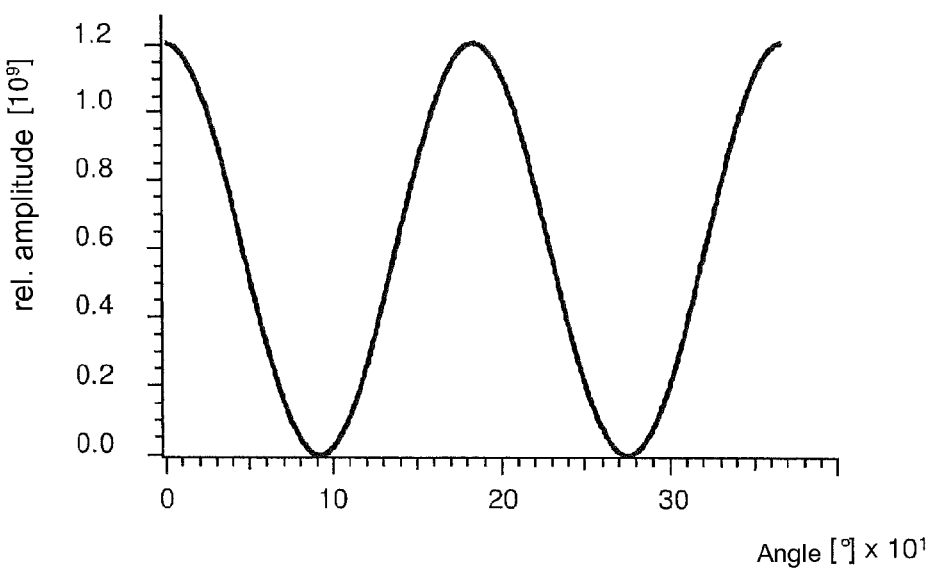

FIG. 10 the amplitudes of the sum signal of the signals of the first and second receptor of the device of FIG. 1.

FIG. 1 provides a schematic depiction of a device 10 for measuring the rotating angle of two objects 11, 12 rotating around a rotating axis D relative to each other. Here only the object 11 takes the form of a rotating object, for example, the shaft of a motor. To be measured is the rotating angle of the shaft relative to a stationary part, e.g., the motor housing, or a stationary machine part, which represents the other object 12.

The device 10 has a transmitter 20 which emits polarized light, or whose unpolarized light is polarized by a polarization filter. In the present embodiment, the transmitter 20 has a stationary design and, in particular, is positioned on the object 12. The transmitter 20 has an optical axis A which ideally will coincide with the rotating axis D.

Assigned to the rotating shaft is a polarizer 30, which rotates with the shaft and takes the form of a reflecting polarizer in the present embodiment. To this end, the polarizer 30 may have a polarizing filter, with a mirror positioned behind it.

The device 10 has a first receptor 41 and a second receptor 42. These are positioned at an angular distance of 180° one from the other and are symmetrical to each other and to the optical axis A, and thus to the transmitter 20. In the present case, the first receptor 41 and the second receptor 42 are positioned on the object 12 in stationary fashion. Here the device 10 is driven in reflecting mode. In principle, the device can also be operated in transmission mode, in which case the receptors 41, 42 are positioned behind the polarizer 30 (as seen from the transmitter 20).

The first receptor 41 has a reception area 41a. The second receptor has a reception area 42a. Here the reception areas 41a, 42a are different from each other. In principle, it is possible for the reception areas 41a, 42a to overlap. As a rule, diffused light from adjacent reception areas cannot be excluded. For the exemplary embodiment shown in FIG. 1, which has precisely two receptors 41, 42, the reception areas 41a, 42a are basically designed as adjacent subspaces, which are separated from each other by the plane on which the optical axis A lies. Thus the first receptor 41 basically detects the portion of light that is located in the reception area 41a, as reflected by the polarizer 30—while the second receptor 42 basically detects the portion of light that is located the second reception area 42a, as reflected by the polarizer 30.

The luminosity of the light detected by the receptors 41, 42 varies as a function of the rotating angle of the rotating object 11 and is at a maximum when the polarization plane of the polarized light from the transmitter 20 coincides with the polarization plane of the polarizer 30. It is at a minimum when the polarization plane of the polarized light from the transmitter 20 is perpendicular to the polarization plane of the polarizer 30. Rotation of the object 11 over 360° results in a $\cos^2$ signal with two maxima.

FIGS. 3 and 4 depict two exemplary embodiments of the polarizer 30 of the device in FIG. 1. The polarizer 30 has a polarizing area 31 and a non-polarizing area 32. The non-polarizing area 32 can take the form of, e.g., an absorptive surface or a reflective surface. When a reflective surface is used, it is advantageous if the surface of the reflective area borders the surface of the polarizing area at an angle that differs from 180°, to thereby prevent the reflected light from being detected by the receptors 41, 42.

The non-polarizing area 32 is positioned eccentric to the rotating axis D and can take the form of a circular segment, as shown in FIG. 3, or a circular sector, which is not shown in the figures. As depicted in FIG. 4, the non-polarizing area 32 can also take the form of an area bordered by two intersecting secants. In principle, the non-polarizing area 32 can have any desired form, as long as it is not rotationally symmetrical over 180° of the rotating axis D. When the polarizer with the non-polarizing area has a design of this kind, an additional modulation is effected in the signals detected by the receptors 32—such that the two maxima of the $\cos^2$ signal have different amplitudes. FIG. 9 shows the signal amplitudes of the two receptors 41, 42 of the device in FIG. 1 when a polarizer 30 like that in FIG. 3 or FIG. 4 is used. The sum signal of the two receptors 41, 42, which corresponds to the total luminosity reflected by the polarizer 30, has two maxima of equal value, as is shown in FIG. 10. However, from the differential signal of the two signals obtained by the receptors 41, 42 it is possible to determine whether the shaft 11 is positioned in a given position or in a position rotated 180° thereto, with the overall result that an angular determination becomes possible over a rotating angle of 360°.

To this end, one embodiment of the device in FIG. 1 provides not only for two receptors 41, 42 but also for a third receptor 43 and a fourth 44, which are positioned at an angular distance of 180° relative to each other and at an angular distance of 90° relative to receptors 41, 42. This is shown in FIG. 5. The receptors 43, 44 deliver a $\sin^2$ signal. Here again the segmentation of the polarizer 30 into a polarizing area 31 and a non-polarizing area 32 means that the two maxima of the individual receptors 43, 44 have different amplitudes, with the overall result that the four receptors 41, 42, 43, 44 make it possible to obtain an absolute angular determination over a rotating angle of 360°. The reception areas of the four receptors 41, 42, 43, 44 here are basically four bordering subspaces, which are separated by two planes running basically perpendicular to each other and whose lines of intersection correspond to the optical axis A.

In order to improve the signal quality, and particularly to reduce the incidence of scattered light from adjacent reception areas and to ease the lateral structural tolerances of the receptors 41, 42, a diaphragm 50 is positioned between the receptors 41, 42 and the polarizer 30 in the embodiment shown in FIG. 2. This diaphragm 50 has a first hole 51 and a second hole 52, which are positioned at an angular distance of 180° one from the other and through which light from the reception areas 41a, 42a strikes the receptors 41, 42. In a reflective configuration like that shown in FIGS. 1 and 2, the diaphragm 50 also has a central hole 59, so that the light emitted by the transmitter 20 can fall on the polarizer 30.

The diaphragm 50 shown in FIG. 7 can be used in a configuration with the four receptors 41, 42, 43, 44, though in this case two further holes 53, 54 are provided in addition to the central hole 59 and the two diametrically opposite holes 51, 52. These two further holes 53, 54 are also positioned diametrically opposite each other and at an angular distance of 90° from the holes 51, 52.

To increase the resolution, a configuration of eight receptors 41, 42, 43, 44, 45, 46, 47, 48 can be used, as shown in FIG. 6. Here the two diametrically opposite receptor pairs 41, 42; 43, 44; 45, 46; 47, 48 are in each case evaluated together, and the differential signal of the corresponding detected signals is determined. To improve the tolerances a diaphragm 50 can also be positioned in front of such an optical configuration, as shown, e.g., in FIG. 8. This diaphragm has eight holes 51, 52, 53, 54, 55, 56, 57, 58 positioned at equal angular distances and has a corresponding central hole 59 positioned in front of the transmitter 30. The use of additional receptor pairs can further improve the resolution.

One or a plurality of lenses can be positioned in front of the transmitter 20 and/or the receptors 41, 42, 43, 44, 45, 46, 47, 48 in order to increase the signal intensity and/or to so structure the device that it has greater tolerance for mechanical influences.

It is also possible to design the polarizing area 31 of the polarizer 30 so that it has two or more areas, each separate from the other, that have different polarizing directions, in order to thereby improve the resolution of the angular measurement and improve the signal quality.

Use of the segmented polarizer 30 allows both the polarizer 30 and the receptors 41, 42, 43, 44, 45, 46, 47, 48 to be used in planar fashion, i.e., integrally, and this provides the device 10 with robust protection from dirt and contamination. The device 10 is also rugged with respect to mechanical tolerances—for example, the axial throw of the shaft, tipping, or jostling of the rotating object 11. Dynamic eccentricity and/or tipping of the polarizer 30, as caused by the mechanical tolerances of the rotating object 11, can be partially compensated for by a differential evaluation of the signals of the two detectors positioned at angular distance of 180°.

The angle measured by the device 10 is independent of the design of the non-polarizing areas 32. Additional components for determining whether the object 11 is in a given position, or is rotated 180° thereto, are not necessary, however. This makes possible a simpler, more cost-effective, and, in particular, a more compact design.

One advantage possessed by the rotating object 11 is that it is insensitive to temperatures up to about 150° C., since the polarizer 30 alone is positioned on the rotating object 11 and the rotating object 11 itself is uncoupled, mechanically and therefore thermally, from the optoelectronic and electronic components and, in particular, from the transmitter 20 and the receptors 41, 42, 43, 44, 45, 46, 47, 48.

List of Reference Numerals 10 device
11 object
12 object
20 transmitter
30 polarizer
31 polarizing area
32 non-polarizing area
41 first receptor
41a reception area
42 second receptor
42a reception area
43 third receptor
44 fourth receptor
45 receptor
46 receptor
47 receptor
48 receptor
50 diaphragm
51 hole
52 hole
53 hole
54 hole
55 hole
56 hole
57 hole
58 hole
59 hole
A optical axis
D rotating axis

The invention claimed is:

1. A device (10) for measuring the rotating angle of two objects (11, 12) comprising the two objects (11, 12) which rotate relative to each other around a rotating axis (D), with precisely one transmitter (20), which is assigned to one of the objects (11) and which emits light that is either polarized or becomes polarized by means of a polarization filter, and with a polarizer (30), such that the transmitter (20) and the polarizer (30) rotate relative to each other as a function of the rotating angle, and such that the polarizer (30) has a polarizing area (31) and a non-polarizing area (32), where the non-polarizing area (32) is positioned eccentric to the rotating axis (D), and such that the device (10) has at least a first receptor (41) and a second receptor (42) which measure at least a portion of the luminosity passing through the polarizer (30) or reflected by the polarizer (30), in order to produce signals that are dependent on the rotating angle, and where the first receptor (41) has a first reception area (41a), and the second receptor (42) has a second reception area (42a) which is distinct from the first reception area (42a), wherein the receptors are positioned so as to produce a sine wave signal with maxima of different amplitudes but no phase shift.

2. The device according to claim 1, wherein the non-polarizing area (32) is designed as a circular segment or a circular sector.

3. The device according to claim 1, wherein the non-polarizing area (32) is designed as an absorptive area.

4. The device according to claim 1, wherein the non-polarizing area (32) is designed as a reflective area which is positioned at angle of 180° relative to the surface of the polarizing area (31).

5. The device according to claim 1, wherein the polarizer (30) is designed as a reflective polarizer.

6. The device according to claim 1, wherein there is positioned between the polarizer (30) and the receptors (41, 42, 43, 44, 45, 46, 47, 48) a diaphragm (50), which has a hole 51, 52, 53, 54, 55, 56, 57, 58 for each receptor (41, 42, 43, 44, 45, 46, 47, 48) and, in particular, has a central hole (49) for the transmitter (20).

7. The device according to claim 1, wherein the first and second receptor (41, 42) are symmetrically positioned at an angular distance of 180° from the transmitter (20), and a third and fourth receptor (43, 44), are provided, such that the four receptors (41, 42, 43, 44) are positioned at an angular distance of 90° one from the other.

8. The device according to claim 1, wherein the polarizing area (31) of the polarizer (30) has at least two different polarizing directions.

9. The device according to claim 7, wherein a total of eight receptors (41, 42, 43, 44, 45, 46, 47, 48) are provided which are positioned an equal angular distance one from the other.

\* \* \* \* \*